(12) United States Patent
Mayer et al.

(10) Patent No.: US 10,371,323 B2
(45) Date of Patent: Aug. 6, 2019

(54) TWISTABLE BASE FOR A LAMP TUBE

(71) Applicant: OSRAM GmbH, Munich (DE)

(72) Inventors: Johann Mayer, Konigsbrunn (DE);
Michael Schowel, Regensburg (DE);
Wiglef Kutschke, Augsburg (DE)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 15/326,986

(22) PCT Filed: May 15, 2015

(86) PCT No.: PCT/EP2015/060747
§ 371 (c)(1),
(2) Date: Jan. 17, 2017

(87) PCT Pub. No.: WO2016/012124
PCT Pub. Date: Jan. 28, 2016

(65) Prior Publication Data
US 2017/0211752 A1    Jul. 27, 2017

(30) Foreign Application Priority Data
Jul. 21, 2014   (DE) ........................ 10 2014 214 175

(51) Int. Cl.
*F21K 9/272* (2016.01)
*F21K 9/275* (2016.01)
(Continued)

(52) U.S. Cl.
CPC .............. *F21K 9/272* (2016.08); *F21K 9/275* (2016.08); *F21K 9/65* (2016.08); *H01R 33/0827* (2013.01);
(Continued)

(58) Field of Classification Search
CPC .......... F21K 9/272; F21K 9/275; F21K 9/278; H01R 33/0827; H01R 33/0854;
(Continued)

(56) References Cited

U.S. PATENT DOCUMENTS 9,388,948 B2 * 7/2016 Demuynck ............. F21K 9/175
9,726,330 B2 * 8/2017 Wilcox ................... F21K 9/272
(Continued)

FOREIGN PATENT DOCUMENTS

DE    2011003879 U1    6/2011
DE    202011003879 U1    6/2011
(Continued)

*Primary Examiner* — Alan B Cariaso
(74) *Attorney, Agent, or Firm* — Hayes Soloway PC

(57) ABSTRACT

The invention relates to a base (3, 4, 22) for a lamp tube (1), comprising a securing part (3, 4) for stationarily securing to a front side of the lamp tube (1), and a connection part (22) having at least one electrical contact element (26) for electrically contacting a lamp holder, which connection part (22) can be twisted against the securing part (3, 4), wherein the securing part (3, 4) and the connection part (22) are electrically connected to one another by means of at least one sliding contact (4, 28). A tubular lamp (L) having a lamp tube (1) comprises a base (3, 4, 22) on at least one open end of the lamp tube (1). A method serves to assemble a base (3, 4) on a lamp, tube (1) of the tubular lamp (L). In particular, the invention is suitable for use on retrofit LED lamps as a substitute for fluorescent lamps, in particular T-type lamps, in particular T8-type lamps.

17 Claims, 11 Drawing Sheets

(51) Int. Cl.
  H01R 33/08 (2006.01)
  H01R 33/94 (2006.01)
  F21K 9/65 (2016.01)
  *F21V 19/00* (2006.01)
  *F21Y 103/10* (2016.01)
  *F21Y 115/10* (2016.01)

(52) U.S. Cl.
  CPC ......... H01R 33/0854 (2013.01); H01R 33/94 (2013.01); *F21V 19/003* (2013.01); *F21Y 2103/10* (2016.08); *F21Y 2115/10* (2016.08); *H01R 33/08* (2013.01); *H01R 33/942* (2013.01); *Y02B 20/386* (2013.01)

(58) Field of Classification Search
  CPC ...... H01R 33/94; H01R 33/942; H01R 33/08; Y02B 20/386; F21V 19/003
  See application file for complete search history.

(56) References Cited

U.S. PATENT DOCUMENTS

| | | | |
|---|---|---|---|
| 9,829,181 B2* | 11/2017 | Min | F21V 15/015 |
| 2006/0126325 A1 | 6/2006 | Lefebvre et al. | |
| 2009/0122543 A1 | 5/2009 | Kuo et al. | |
| 2011/0085335 A1 | 4/2011 | Osawa | |
| 2011/0194278 A1 | 8/2011 | Yang et al. | |
| 2011/0235320 A1 | 9/2011 | Cai et al. | |
| 2013/0301255 A1* | 11/2013 | Kim | F21V 23/06 |
| | | | 362/218 |
| 2014/0098527 A1 | 4/2014 | Tsai | |

FOREIGN PATENT DOCUMENTS

| | | | | |
|---|---|---|---|---|
| EP | 2354650 A2 * | 8/2011 | | F21K 9/65 |
| WO | 2008136458 A1 | 11/2008 | | |
| WO | 2012131522 A1 | 10/2012 | | |

* cited by examiner

TWISTABLE BASE FOR A LAMP TUBE

The invention concerns a base for a lamp tube, comprising a fixing part for stationary fixing to an end face of the lamp tube, and a connecting part with at least one electrical contact element for electrically contacting a lamp socket, which connecting part is twistable relative to the fixing part. The invention furthermore concerns a tubular lamp with a lamp tube, wherein a base is arranged at least at an open end of the lamp tube. The invention furthermore concerns a method for mounting a base to a lamp tube of the tubular lamp. The invention is applicable in particular to LED retrofit lamps as replacement for fluorescent lamps, in particular of type T, in particular type T8.

To conduct electrical energy through a rotatable base of a tube lamp with light-emitting diodes (LEDs) as light sources, it is known to use a cable, the conductors of which are connected firstly to a circuit board carrying the LEDs and secondly to contact pins of the base. This arrangement however demands great complexity in automated assembly, since capturing the conductor ends and threading them into the contact pins leads to problems due to the inherent stresses in the conductors. Therefore manual assembly is used at great expense, wherein a twisting cable is folded into the housing after soldering of the conductors (e.g. wires). This leads to a further disadvantage since the folded cable takes up a comparatively large amount of space.

The object of the present invention is to at least partially overcome the disadvantages of the prior art, and in particular provide a simple rotatable base for a tubular lamp which can be fitted more economically, and in particular requires only little installation space.

This object is achieved according to the features of the independent claims. Preferred embodiments are described in particular in the dependent claims.

The object is achieved by a base for a lamp tube, comprising a fixing part for stationary fixing to an end face of the lamp tube and a connecting part with at least one electric contact element for electrically contacting a lamp socket, which connecting part is twistable relative to the fixing part, wherein the fixing part and the connecting part are electrically connected together by means of at least one sliding contact.

This base has the advantage that there is no need for cable which is awkward to handle, and the sliding contact allows simplified automated assembly. Also, a particularly compact design can be achieved.

The base may for example be a G-type base, e.g. G5 or G13, or resemble such a base so that it fits into a corresponding lamp socket for a conventional G-base (retrofit base).

The lamp tube may e.g. be a conventional lamp tube for tubular lamps of type T, e.g. type T5 or T8. The stationary fixing of the fixing part to the end face of the lamp tube may in particular include that the fixing part cannot be twisted relative to the lamp tube under normal load. The lamp tube may also be called a strip light.

By twisting the connecting part relative to the fixing part, in particular for semiconductor retrofit lamps, a light emission pattern can be oriented in the room.

The term "slip or sliding contact" may in particular mean an electrical contact between two sliding contacts or sliding contact bodies, which may be offset laterally relative to each other and can slide on each other while retaining their electrical connection. If the connecting part and the fixing part are twisted relative to each other, then at least one sliding contact of the fixing element and at least one sliding (counter-)contact of the connecting part can slide on each other. The sliding contact of the fixing element may in particular be electrically connectable to a circuit board, the sliding (counter-)contact of the connecting part may in particular connectable to an electrical contact element of the connecting element.

The two electrically conductive sliding contacts may be made from the same material or from materials of different hardness, in particular metal.

It is advantageous, in particular for the use of conventional sockets for pin bases (in particular so-called bi-pin bases), if the base has two electrical contact elements. Each of these may be assigned a sliding contact of the fixing element, and where applicable also a sliding counter-contact if the electrical contact element does not already itself constitute the sliding counter-contact.

The connecting part and the fixing part are in particular multipiece parts of the base which are assembled from separately produced individual components.

In one embodiment, the fixing part has at least one sliding contact formed as a spring element which has a sliding contact region facing the contact part and a region provided for electrical connection to a circuit board. Such a sliding contact allows a particularly simple assembly, which in particular can also be automated easily. Because of the configuration as a spring element, a secure contact against the sliding counter-contact is ensured by means of an elastic spring return force.

In yet another embodiment, the spring element has a pressing or clamping region which is provided for contact against a circuit board. Thus the circuit board can easily be contacted electrically by the spring element in a linear movement, e.g. a push-fit movement. The spring element then serves as a clamping contact. This allows an electrical contact between the base and the circuit board to be established in a particularly simple and automatable manner.

For simple and economic production, the spring element may be a sheet metal element e.g. a bent strip of sheet metal.

The at least one sliding contact, in particular the at least one spring element, may be held or secured in a body of the fixing part made of electrically isolating material. The electrically isolating material may e.g. be plastic or ceramic.

The connecting part too has in particular a body of electrically isolating material which in particular holds or is connected to at least one contact element. The electrically isolating material may here again be e.g. plastic or ceramic.

Alternatively or additionally, the connecting part may comprise at least one sliding contact configured as a spring element.

In a further embodiment, the fixing region has at least one indentation for insertion of a circuit board arranged in the lamp tube. In this way the circuit board can easily be inserted in the fixing part in an automatable fashion.

For a particularly simple electrical contacting or connection of the fixing part and circuit board, it is advantageous that at least one spring element, for example as already described above, protrudes into the receiver. When the circuit board is inserted in the fixing part or when the fixing element is pushed onto the circuit board, the circuit board presses the at least one spring element out of the receiver so that, because of its elastic return force, the spring element presses against the circuit board. Here the circuit board is preferably configured such that in an inserted state, it has a conductor track portion, e.g. a contact field, on the contact face to the spring element.

In yet a further embodiment, the at least one contact element of the connecting part is configured in the form of at least one contact pin. This allows compatibility with conventional G-type bases.

The contact pin may itself already completely constitute the sliding counter-contact. In an alternative embodiment, the contact pin is connected to a sliding counter-contact attached to the connecting part, which extends in a peripheral extension further around a rotary axis than the contact pin, and which is in sliding contact with a sliding contact of the fixing part. The separately produced sliding counter-contact thus allows provision of a region enlarged in the peripheral extension and hence in the rotation direction, for the sliding contact. This allows a secure electrical connection of the mutually contacting sliding contacts, even if the fixing part and connecting part are twisted through a great angle. The contact pin and the assigned sliding counter-contact may for example be connected together by means of a press fit, by welding and/or by gluing. In particular, the contact pin may be inserted in a hole of the sliding counter-contact.

Alternatively, the contact pin may be widened at its end facing the fixing part, at least in the peripheral direction.

In yet another embodiment, the connecting part has a body of electrically isolating material through which the at least one contact pin is guided. This body may in particular correspond to the body described above. This body allows a secure holding with effective electrical isolation from other electrically conductive components, e.g. other contact pins.

The body or base body may be configured in the form of disc standing vertically to a rotation direction and made of electrically isolating material, through which the at least one contact pin is guided. A disc takes up little construction space and is simple to produce. The disc may have at least one hole for passage of a respective contact pin. The disc is in particular circular.

The at least one sliding counter-contact is in particular arranged on a back side facing the fixing part. The at least one contact pin is in particular connected on the back to a respective sliding counter-contact.

In yet another embodiment, the sliding counter-contact has a basic form of a ring sector which is oriented around the rotary axis. This allows a twist through a large angle with little material usage.

In another embodiment, the connecting part has a locking peg on its back side. This allows a secure, simple and in particular automatable fixing to the fixing part by means of a simple push-fit process. The fixing part for this has in particular a region with a continuous, in particular cylindrical, bore or passage (referred to below without restriction of generality as the "sleeve region"), wherein the locking peg can e.g. be inserted rotatably in the passage of the sleeve region and engages behind this in mounted state. The sleeve region may constitute a part of the body.

The locking peg may be present on a back side of a body configured as a disc. It may be produced integrally with the disc, e.g. by means of an injection moulding process. The locking peg may be arranged centrally on the body, in particular on the disc.

In a refinement, a rotary axis of the locking peg coincides with a longitudinal axis of the lamp tube.

In yet another embodiment, the connecting part and the fixing part can be locked in various rotary positions relative to each other. Thus with simple means, a precise rotation of the base can be achieved. This may e.g. be favourable if a large number of tubular lamps are to be twisted through the same angle.

In an easily implementable refinement of this, the fixing part or the connecting part has a locking protrusion which can engage in a recess of a row of recesses of the other part. On rotation of the connection part relative to the fixing part, the locking protrusion may come out of the original recess and slip into another recess. The locking protrusion may e.g. be configured as a locking tooth, and the row of recesses as a tooth row.

In yet a further embodiment, the fixing region has a retaining cap, in particular open in the middle, for fixing to the lamp tube. This allows an easily implementable and particularly secure fixing to the lamp tube.

The lamp tube may in its end region have a constricted cross-section ("rolling") which e.g. facilitates the application of a retaining or end cap.

The object is also achieved by a tubular lamp with a lamp tube, wherein a base as described above is arranged at least at an open end of the lamp tube. This tubular lamp may be configured similarly to the base and give the same advantages.

Thus the fixing part may be at least partly inserted into the open end. The tubular lamp may have a circuit board accommodated in the lamp tube and connected to the fixing part. The circuit board may in particular be inserted in the fixing part.

In yet a further embodiment, the tubular lamp is a semiconductor retrofit lamp. It is thus a replacement lamp for conventional tubular lamps and has at least one semiconductor light source as the light source(s). The semiconductor retrofit lamp may in particular be provided as a replacement for a fluorescent lamp, e.g. type T, in particular type T5 or T8.

The lamp tube may be straight or curved. The lamp tube is at least in regions light-permeable, in particular transparent or opaque. In a refinement, the lamp tube is made of glass. It may in particular be coated on the inside with a light-scattering layer.

The circuit board is in particular a strip-like circuit board. In the case of a semiconductor retrofit lamp, the circuit board is fitted with the at least one semiconductor light source, i.e. equipped on one side. The circuit board may be secured in the lamp tube e.g. by means of at least one retaining clamp and/or by means of at least one adhesive point.

The at least one semiconductor light source may be configured as at least one light-emitting diode (LED). In the presence of several LEDs, these may illuminate in the same colour or in different colours. One colour may be monochromatic (e.g. red, green, blue etc.) or polychromatic (e.g. white). Also, the light emitted by the at least one LED may be an infrared light (IR LED) or an ultraviolet light (UV LED). Several LEDs may generate a mixed light, e.g. a white mixed light. The at least one LED may contain at least one wavelength-converting phosphor (conversion LED). The phosphor may alternatively or additionally be arranged separately from the LED (remote phosphor). The at least one LED may be present in the form of at least one individually encapsulated LED, or in the form of at least one LED chip. Several LED chips may be mounted on a common substrate (submount). The at least one LED may be equipped with at least one specific and/or common lens for guiding the beam, e.g. at least one Fresnel lens, collimator, etc. Instead of or in addition to inorganic LEDs, e.g. based on InGaN or AlInGaP, in general also organic LEDs (OLEDs, e.g. polymer OLEDs) may be used. Alternatively, the at least one semiconductor light source may e.g. comprise at least one diode laser.

The object is also achieved by a method for mounting a base onto a lamp tube of the tubular lamp, which method comprises at least the following steps: introduction of the fixing part in the lamp tube, in particular up to a stop; pulling of the retaining cap over the fixing part and an end region of the lamp tube; and insertion of the connecting part in the fixing part, in that the locking peg is inserted in the sleeve region of the fixing part and engages behind it.

The properties, features and advantages of this invention described above, and the manner in which these are achieved, will become clearer and more easily understood in connection with the following diagrammatic description of an exemplary embodiment, which is explained in more detail in connection with the drawings. For the sake of clarity, the same or equivalent elements carry the same reference numerals.

Figure 1:
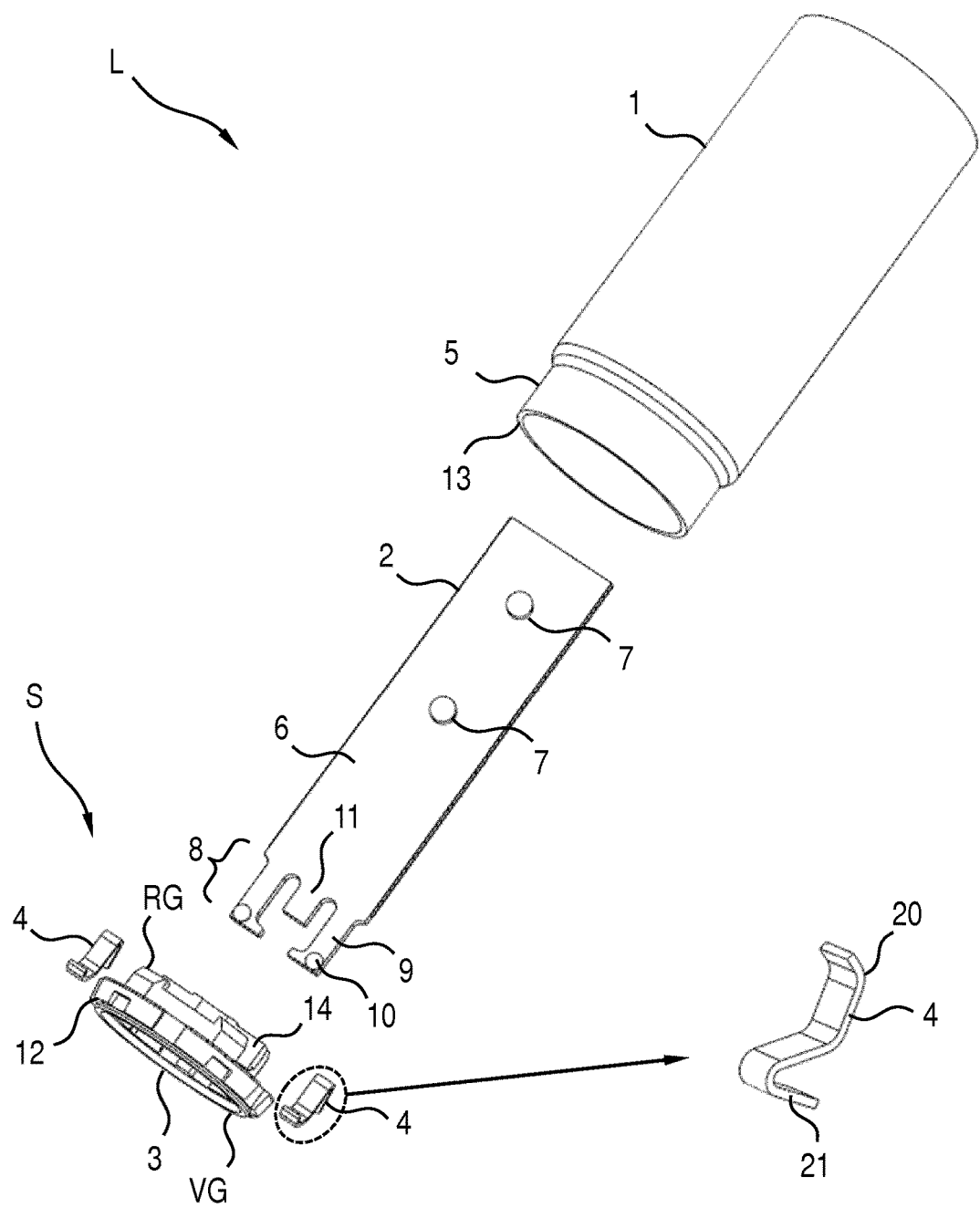
FIG. 1 shows, in an oblique exploded view from above, several parts of an LED retrofit tubular lamp.

FIG. 1 shows several parts of an LED retrofit tubular lamp L, namely an end-side extract of a lamp tube 1, an end-side extract of a circuit board 2, a body 3 and two sliding contacts configured as spring elements 4, which constitute components of a fixing part 3, 4 of a base S. A spring element 4 is shown enlarged and rotated.

The lamp tube 1 consists of transparent glass which has been coated on the inside with a light-scattering diffuser layer. At an end region, it has a rolling 5.

The circuit board 2 has a strip-like, flexible or rigid board 6 which on one ("front") side has a plurality of LEDs 7 arranged in series. On an end region 8, the board has two push-fit protrusions 9, on each of which a contact field 10 is present as part of a conductor track (not shown). There is also a stop 11 at the end.

Figure 2:
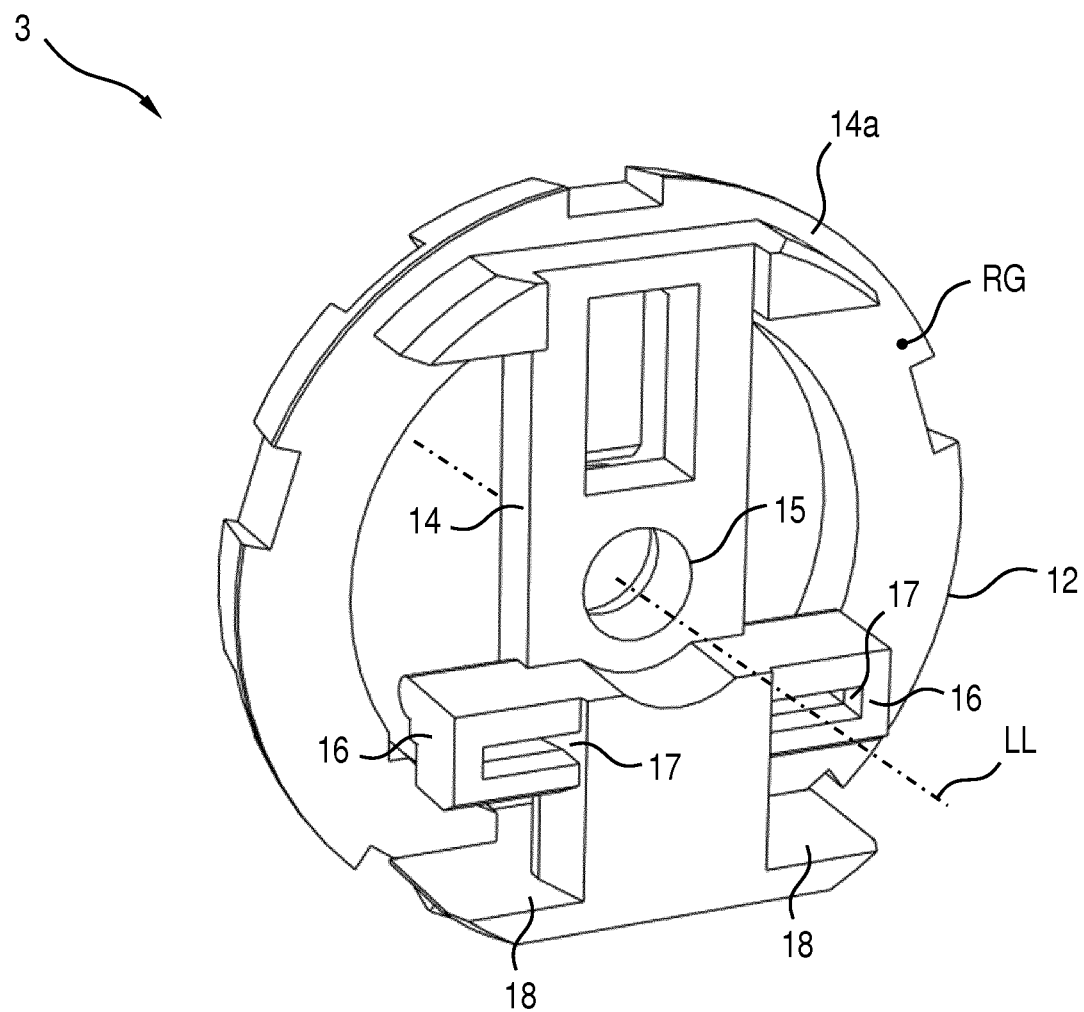
FIG. 2 shows, in an oblique view from the rear, a body of a fixing part of a base of the LED retrofit tubular lamp.
Figure 3:
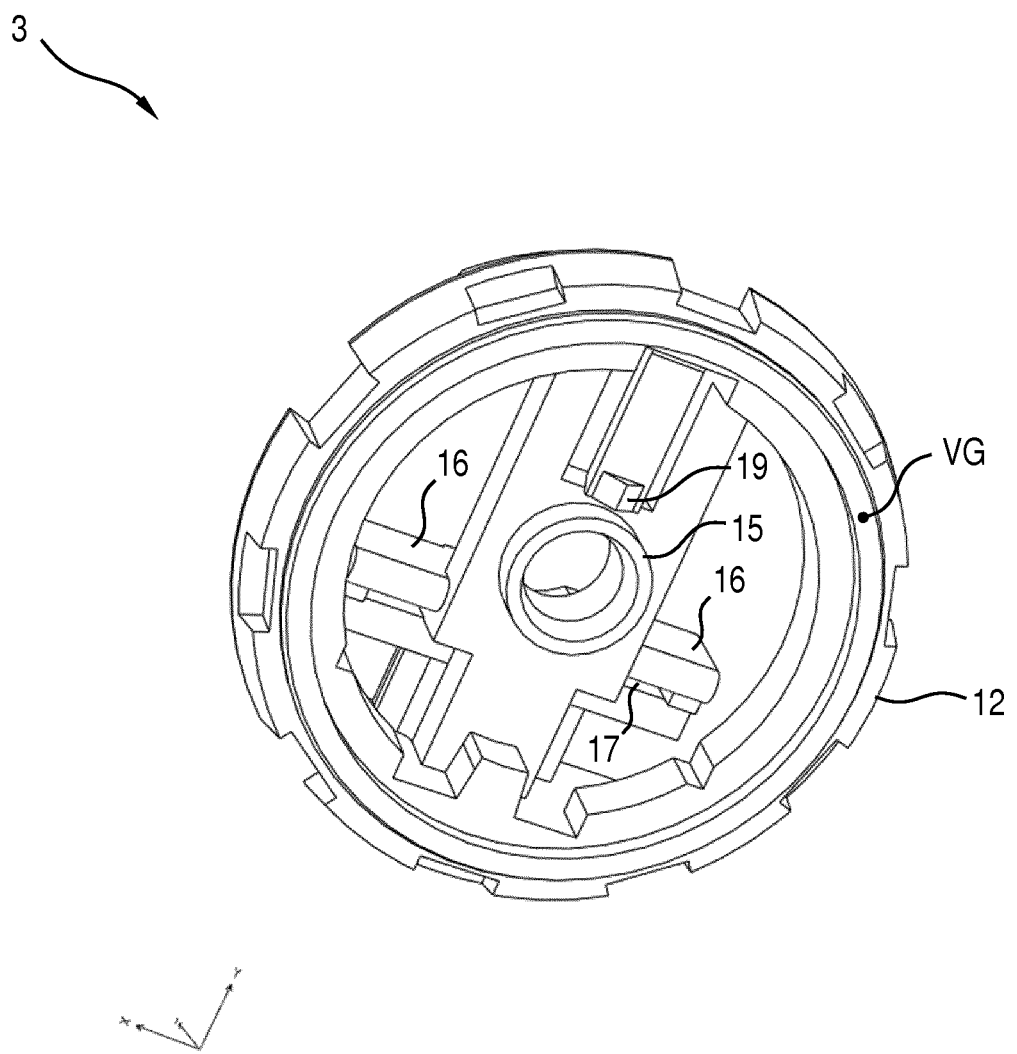
FIG. 3 shows the body from FIG. 2 in an oblique view from the front.

The body 3 is made of plastic and has an annular basic form, as shown in FIG. 2 in an oblique view from the rear of a back side RG facing the lamp tube 1, and in FIG. 3 in an oblique view from the front of a front side VG facing away from the lamp tube 1. A ring region 12 of the body 3 is wider than an end face edge 13 of the lamp tube 1. A holding region 14 integrally adjoins a back of the ring region 12. The outer extension of this region corresponds to an inner diameter of the edge 13, so that on the back of the ring region 12 between the holding region 14 and an outer edge, a support surface 14a is provided for the edge 13 of the lamp tube 1. Up to that point, and hence also with the holding region 14, the body 3 can be introduced into the lamp tube 1. The holding region 14 is dimensioned so as to prevent a lateral play of the body 3 in the lamp tube 1.

The holding region 14 has a sleeve region with a continuous bore 15. A longitudinal axis LL of the bore 15 corresponds to a longitudinal axis of the lamp tube 1.

The holding region 14 furthermore has two fixing regions 16 for fixing of the spring elements 4 by force and/or form fit. These elements may in particular be inserted, in particular clamped, in corresponding slots 17 of the fixing regions 16.

The holding region 14 also has two receiving indentations 18 to receive the push-fit protrusions 9 of the circuit board 2. The receiving indentations 18 are delimited at the front by the ring region 12, and loosely delimited at the top by the fixing regions 16. Between the receiving indentations 18, the holding region 14 serves as a support for the stop 11 of the circuit board.

The holding region 14, as shown in FIG. 3, has a forward protruding locking tooth 19 on its front side VG.

Going back to FIG. 1, the spring element 4 is configured as a bent sheet metal strip, e.g. of copper, steel, iron or aluminium. It may comprise a corrosion-stable and/or abrasion-resistant, or alternatively soft, surface coating with particularly good electrical conductivity, e.g. made of tin or zinc.

The spring element 4 is bent such that it has an elastically sprung sliding contact region 20 which is curved to allow smooth sliding. The spring element 4 on its other end has an elastically sprung clamping region 21 angled obliquely thereto.

Figure 4:
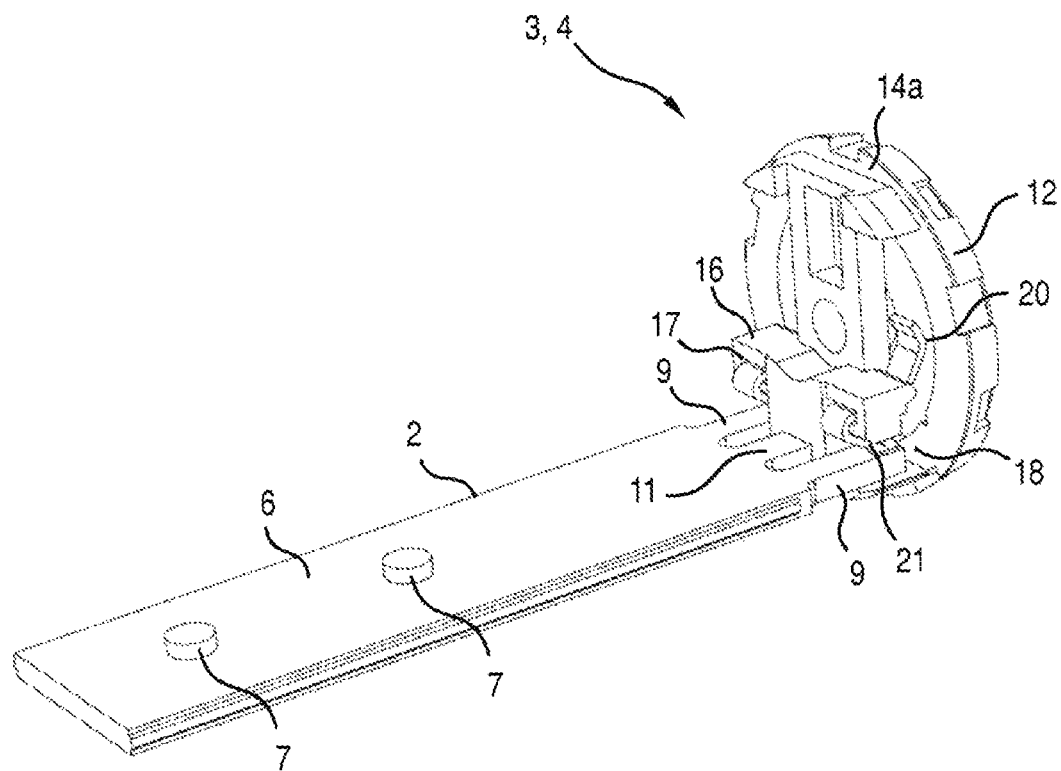
FIG. 4 shows, in an oblique view from behind, the fixing part of the LED retrofit tubular lamp with circuit board inserted.

FIG. 4 shows the fixing part 3, 4 of the LED retrofit tubular lamp 1 in an oblique view from the rear with the circuit board 2 inserted. The push-fit protrusions 9 of the circuit board 2 are now pushed or plugged into the receiving indentations 18 as far as the stop 11. The clamping region 21 of the spring element 4 protrudes obliquely into the respective receiving indentation 18, so that the clamping region 21 is bent upward on introduction of the circuit board 2. In the inserted or pushed-in state, the spring element 4 presses—with the fixing region 16 as an abutment—on the circuit board 2, more precisely on the contact field 10. Thus an electrical clamping contact (here, two in total) is created between the spring element 4 and the circuit board 2.

Figure 5:
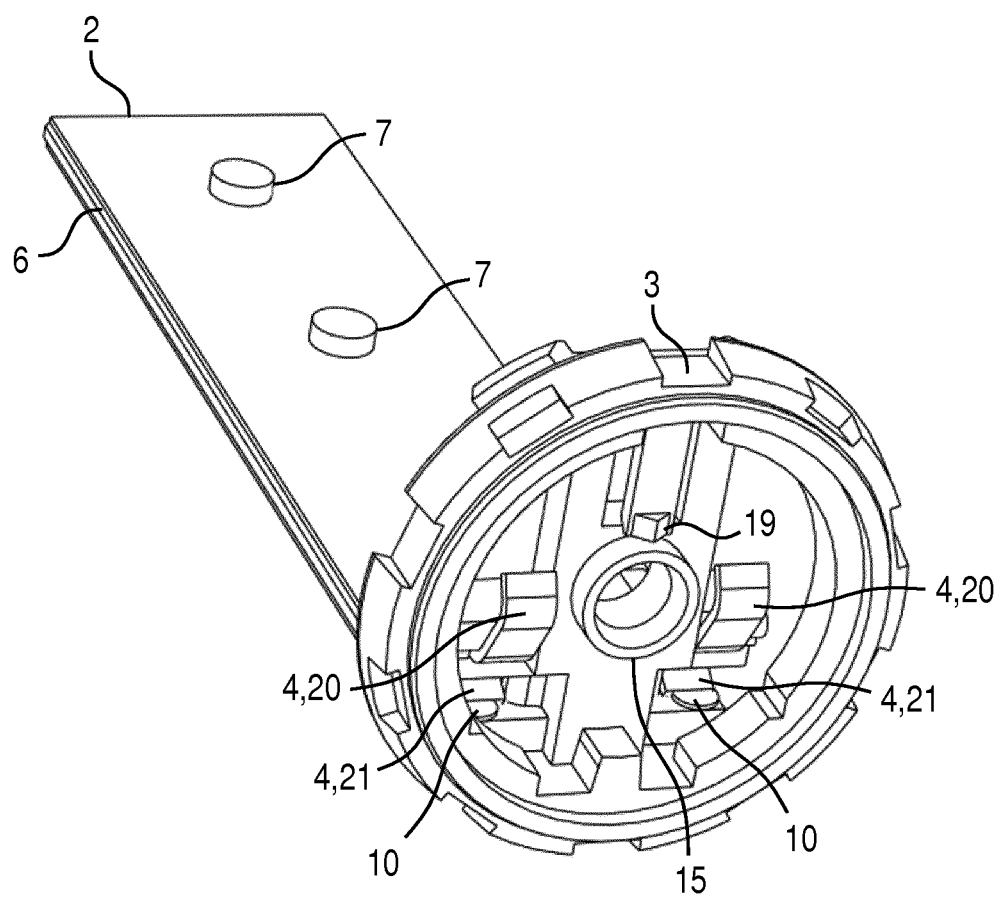
FIG. 5 shows, in an oblique view from the front, the fixing part of the LED retrofit tubular lamp with circuit board inserted.

FIG. 5 shows the fixing part 3, 4 of the LED retrofit tubular lamp L in an oblique view from the front with circuit board 2 inserted. The sliding contact regions 12 point forwards and are arranged symmetrically on either side of the bore 15.

Figure 6:
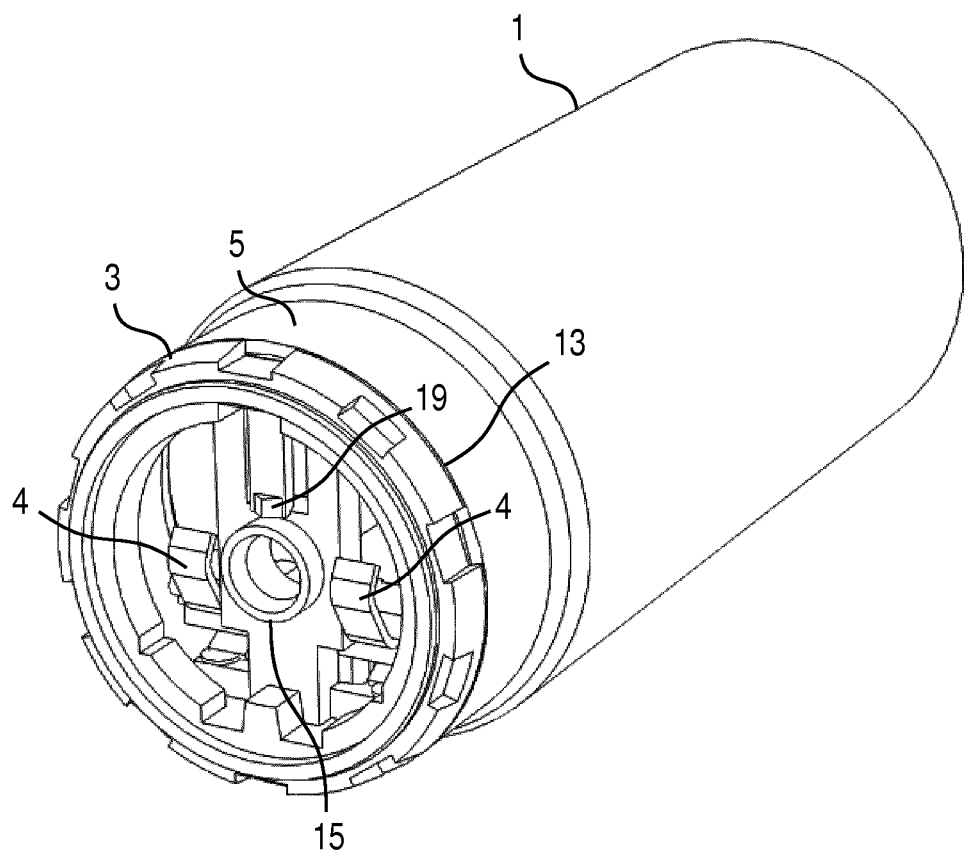
FIG. 6 shows, in an oblique view from the front, the fixing part inserted in a lamp tube.

FIG. 6 shows an oblique view from the front of the fixing part 3, 4 inserted in the lamp tube 1. The ring region 12 of the body 3 rests with its contact surface 14a on the edge 13 of the lamp tube 1.

Figure 7:
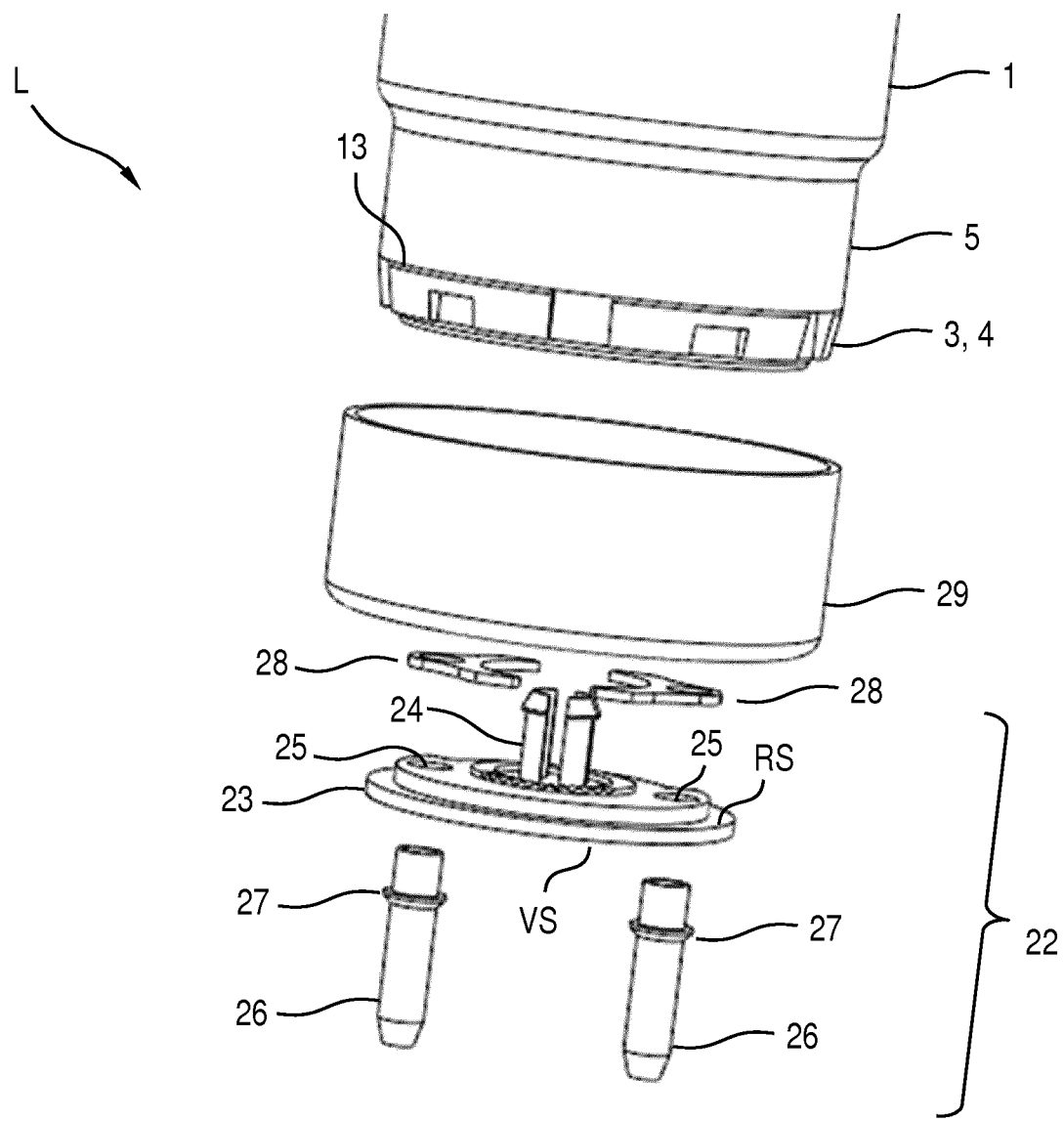
FIG. 7 shows, in an oblique view from above, the LED retrofit tubular lamp in a partially exploded depiction.

FIG. 7 shows in an oblique view from above the LED retrofit tubular lamp L in a partially exploded depiction, namely with the fixing part 3, 4 from FIG. 6 inserted in the lamp tube 1, and an exploded depiction of a connecting part 22 not yet mounted.

The connecting part 22 has a circular disc-shaped body 23 of plastic, from the back RS of which a locking peg 24 protrudes centrally, its longitudinal axis corresponding to the longitudinal axis L. The body 23 has two holes 25 arranged symmetrically to the locking peg 24 and provided for the insertion of two contact pins 26 made of metal, e.g. copper, starting from a front side VS. The contact pins 26 each have peripheral collars 27 which serve as stops relative to the body 23. On the back RS of the body 23, two sliding counter-elements 28 are arranged, which take the form of ring sectors or half-moons and are made of metal, e.g. copper, for sliding or slip contacting of the sliding contact regions 20 of the spring elements 4.

The fixing part 3, 4 may be held on the edge 13 of the lamp tube 1 by pulling an end or retaining cap 29 onto the rolling 5. The fixing part 3, 4 is not twistable relative to the lamp tube 1 and is therefore stationary relative to this. The retaining cap 29 may e.g. be fixed to the rolling 5 by a clamping fit and/or by gluing.

Figure 8:
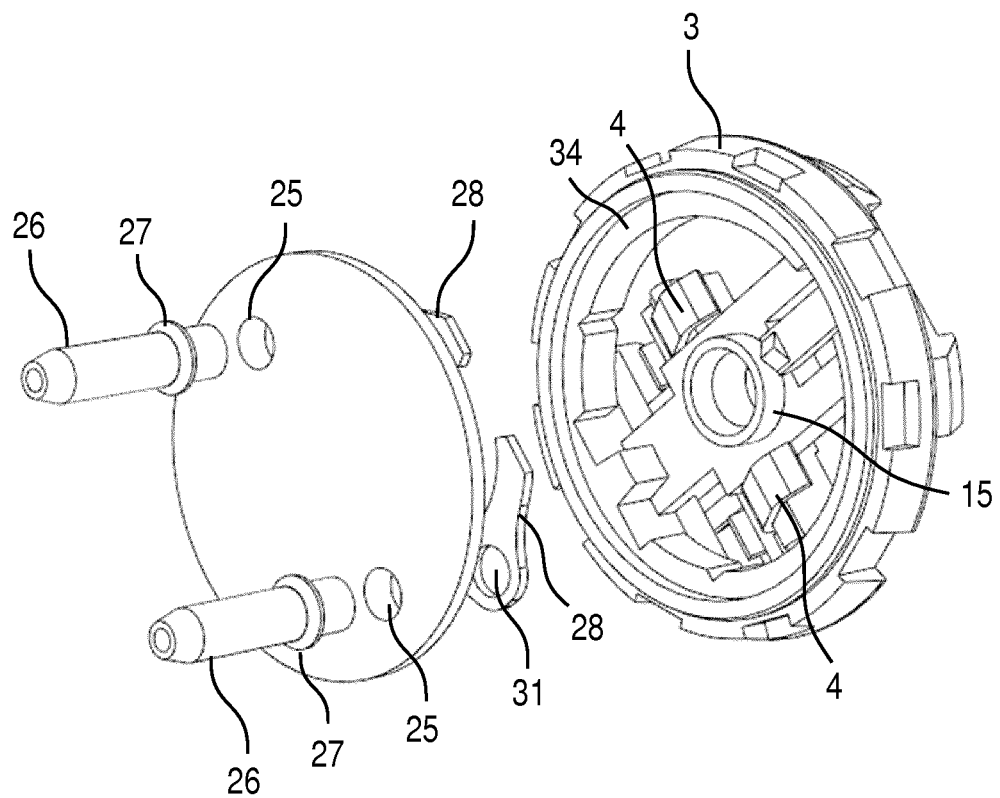
FIG. 8 shows the base in the partially exploded depiction in an oblique view from the front.

FIG. 8 shows the base 3, 4, 22 in an oblique view from the front, in a partially exploded depiction. For mounting of the connecting part 22, the contact pins 26 are introduced as far as the collar 27 into the corresponding holes 25 of the body 23 and into corresponding holes 31 in the sliding counter-elements 28. The contact pins 26 may be held e.g. in a clamp fit with the sliding counter-elements 28.

Figure 9:
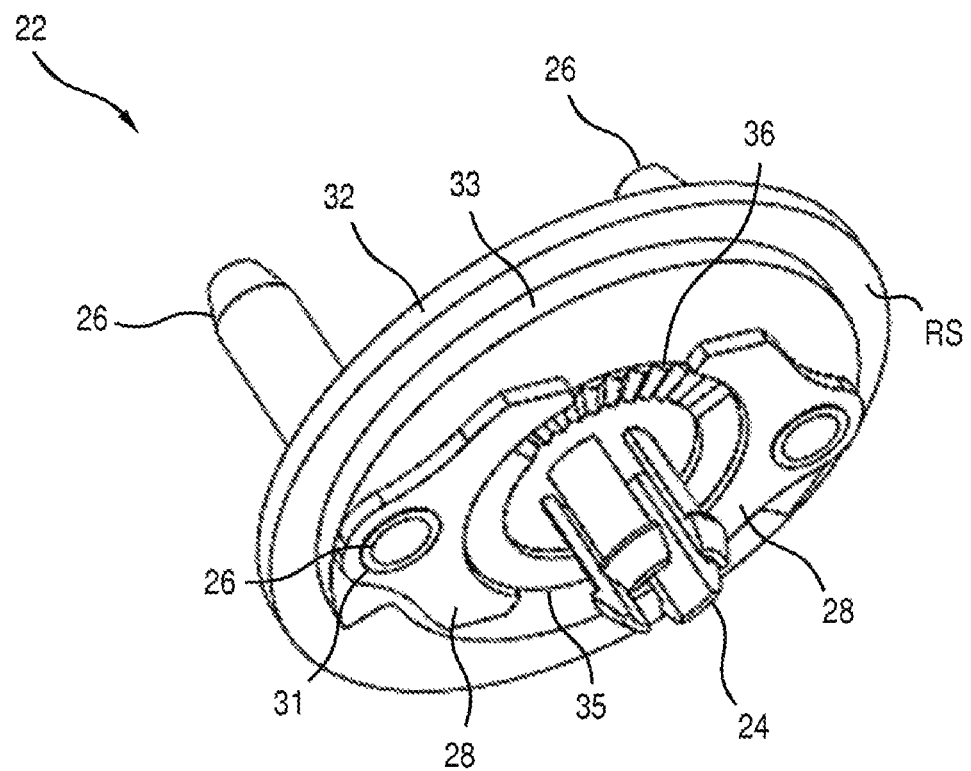
FIG. 9 shows the connecting part in an oblique view from the rear.

FIG. 9 shows the connecting part 22 in an oblique view from the rear. At a distance from an outer edge 32, the body 23 has a disc-like first base region 33 which serves as a lateral guide relative to the body 23 of the fixing part 3, 4. For this, the body 23 has a peripheral step 34 (see FIG. 8) on which the base region 33 may be placed rotatably.

The body 23 furthermore has a disc-like second base region 35 in ring form, which is arranged around the locking peg 24. This base region 35 firstly serves as a twist prevention for the sliding counter-elements 28, and secondly comprises a tooth row 36, wherein the spaces between the teeth serve as locking rebates for engagement with the locking tooth 19 of the body 3.

Figure 10:
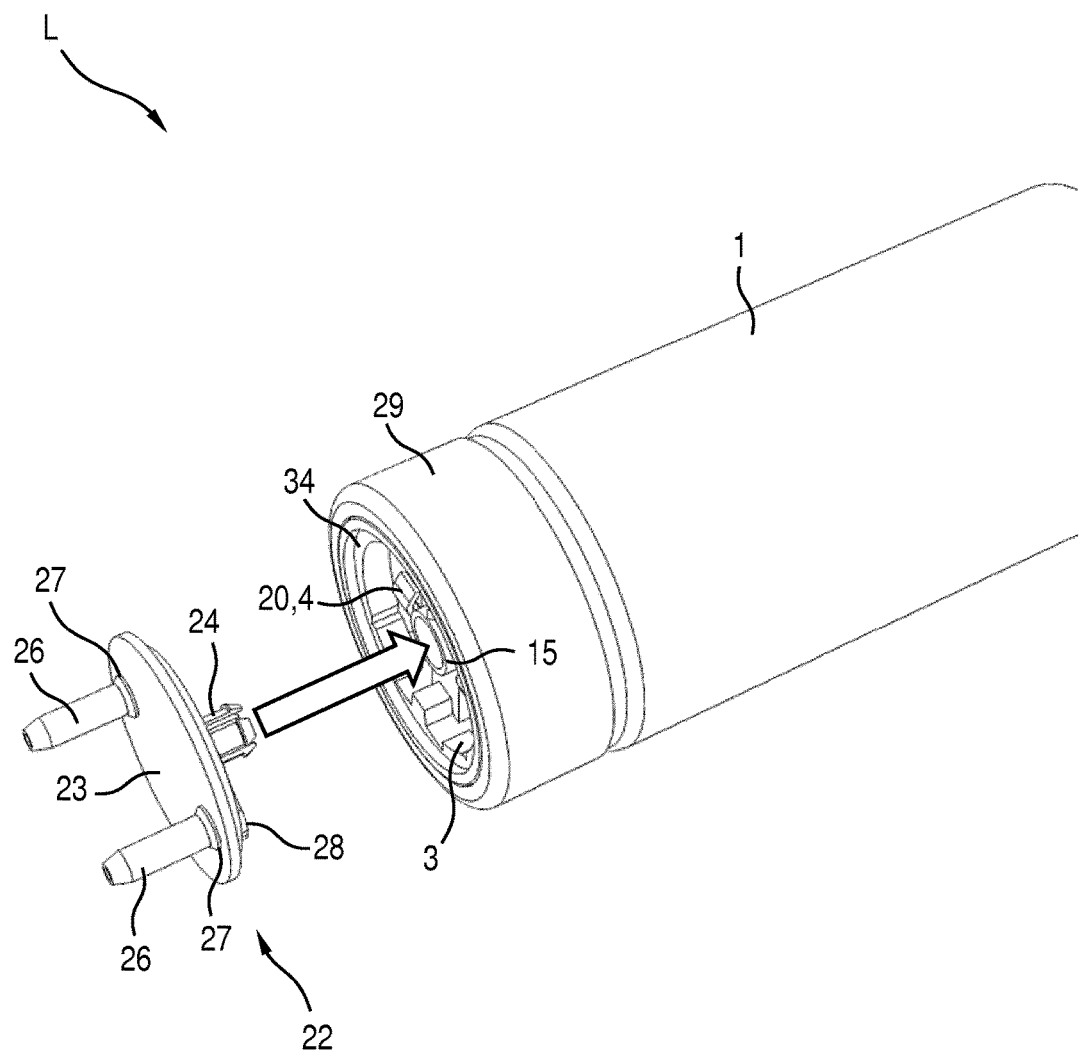
FIG. 10 shows an oblique view from the front of the LED retrofit tubular lamp with the connecting part of the base not yet mounted.
Figure 11:
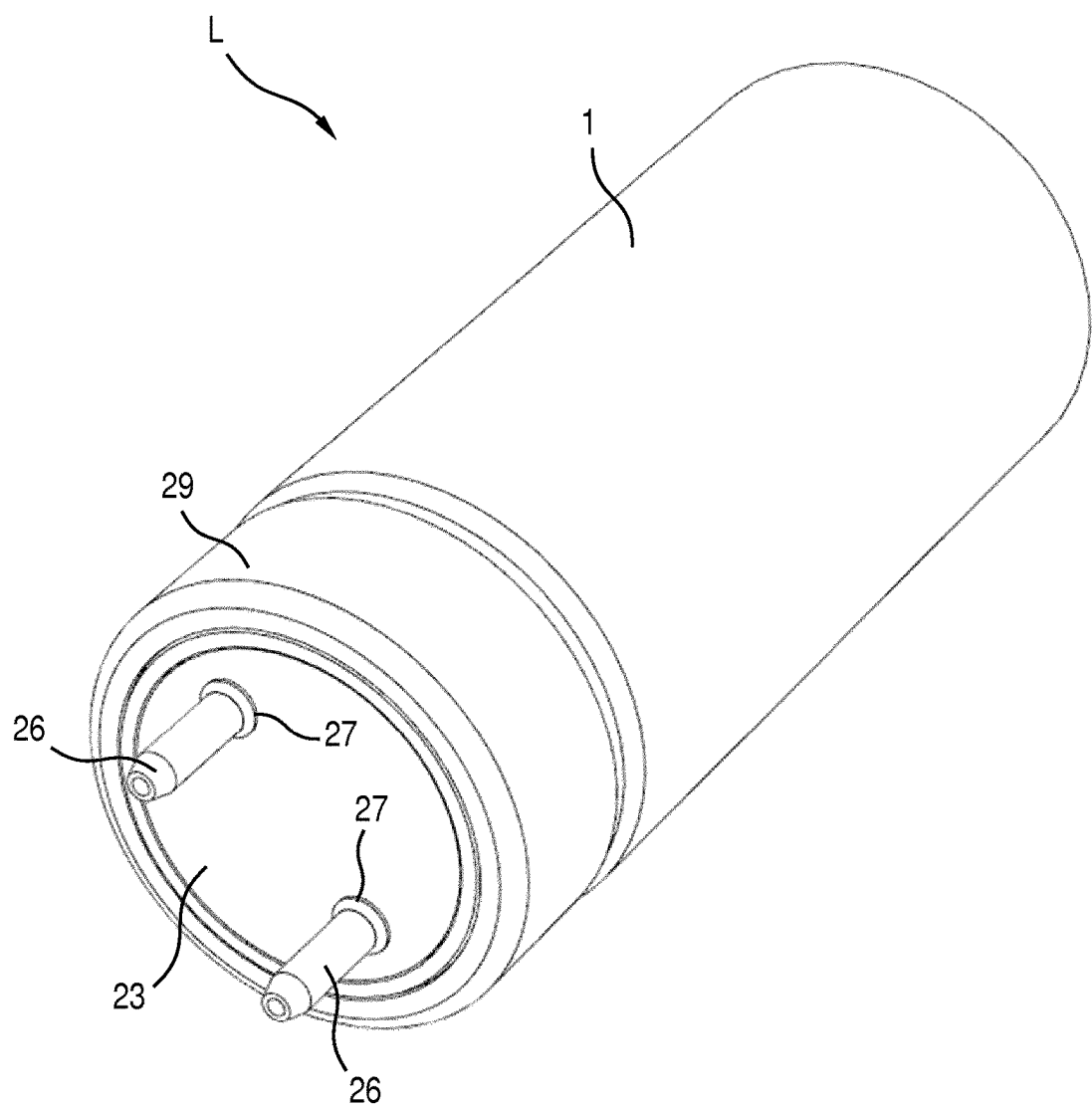
FIG. 11 shows, in an oblique view from the front, the ready-mounted LED retrofit tubular lamp with twisted base.

FIG. 10 shows the LED retrofit tubular lamp L in an oblique view from the front, with the connecting part 22 of the base 3, 4, 22 not yet mounted. For mounting, the locking peg 24—which can be compressed because of its slot—is inserted in the continuous bore 15 and locks or snap-engages therewith, as indicated by the arrow. It can be twisted in steps or stages by engagement of the locking tooth 19 in the tooth row 36, as shown in FIG. 11 with reference to the ready-mounted LED retrofit tubular lamp L. Here the sliding counter-elements 28 slide against the sliding contact regions 20 of the spring elements 4. Thus for power supply to the LEDs 7, two electrical pathways are permanently provided between the connecting part 22 and the circuit board 2, namely from a respective contact pin 26 via a sliding counter-element 28 and onward via a spring contact 4 to the circuit board 2.

Although the invention has been illustrated in detail and described with reference to the exemplary embodiment shown, the invention is not restricted thereto and other variations may be derived by the person skilled in the art without leaving the scope of protection of the invention.

In general, the terms "one" or "a" etc. mean an individual or a plurality, in particular in the sense of "at least one" or "one or more" etc., as long as this is not explicitly excluded e.g. by the expression "precisely one" etc.

Also, a number given may mean precisely the number given and also include a usual tolerance range, as long as this is not explicitly excluded.

LIST OF REFERENCE NUMERALS

1 Lamp tube
2 Circuit board
3 Body
4 Spring element
5 Rolling
6 Board
7 LED
8 End region
9 Push-fit protrusion
10 Contact field
11 Stop
12 Ring region
13 End face edge
14 Retaining region
14a Support face
15 Bore
16 Fixing region
17 Slot
18 Receiving indentation
19 Locking tooth
20 Sliding contact region
21 Clamping region
22 Connecting part
23 Body
24 Locking peg
25 Hole
26 Contact pin
27 Collar
28 Sliding counter-element
29 End or retaining cap
31 Hole
32 Outer edge
33 First base region
34 Step
35 Second base region
36 Tooth row
L LED Retrofit tubular lamp
LL Longitudinal axis
RG Back side of body 3
RS Back side of body 23
VG Front side of body 3
VS Front side of body 23
S Base

The invention claimed is:

1. A base for a lamp tube, the base comprising:
a fixing part for stationary fixing to an end face of the lamp tube; and
a connecting part with at least one electric contact element for electrically contacting a lamp socket, which connecting part is twistable relative to the fixing part;
wherein:
the fixing part and the connecting part are electrically connected together by means of at least one sliding contact;
the at least one contact element of the connecting part is configured in the form of at least one contact pin;
the at least one contact pin is connected to at least one sliding counter-contact attached to the connecting part, which at least one sliding counter-contact extends in a peripheral extension further around a rotary axis than the at least one contact pin, and which at least one sliding counter-contact is in sliding contact with at least one sliding contact of the fixing part; and
the at least one sliding counter-contact has a basic form of a ring sector which is oriented around the rotary axis.

2. The base according to claim 1, wherein the fixing part has at least one sliding contact formed as a spring element which has a sliding contact region facing a contact part and a clamping region provided for pressing on a circuit board.

3. The base according to claim 1, wherein the fixing part has at least one indentation for insertion of a circuit board arranged in the lamp tube.

4. The base according to claim 1, wherein:
the connecting part has a disc, standing vertically to a rotation direction and made of electrically isolating material, through which the at least one contact pin is guided;
the at least one sliding counter-contact is arranged on a back side of the connecting part facing the fixing part; and
the at least one contact pin on the back is connected to a respective sliding counter-contact.

5. The base according to claim 1, wherein:
the connecting part has a locking peg on its back side;
the fixing part has a tubular sleeve region; and
the locking peg is inserted rotatably in the sleeve region and engages there behind.

6. The base according to claim 1, wherein the connecting part and the fixing part can be locked in various rotary positions relative to each other.

7. The base according to claim 1, wherein the fixing part has a retaining cap for fixing to the lamp tube.

8. A tubular lamp with a lamp tube, wherein a base according to claim 1 is arranged at least at an open end of the lamp tube.

9. The tubular lamp according to claim 8, wherein the fixing part is at least partly inserted into the open end.

10. The tubular lamp according to claim 8, wherein the tubular lamp is a semiconductor retrofit lamp.

11. The base according to claim 1, wherein the at least one sliding counter-contact is arranged on a back side of the connecting part facing the fixing part.

12. The base according to claim 11, wherein the at least one sliding counter-contact includes an arcuate face that at least partially surrounds the rotary axis.

13. The base according to claim 1, wherein the at least one contact pin is inserted through a hole formed in the at least one sliding counter-contact.

14. The base according to claim 1, wherein the at least one contact pin is held in a clamp fit with the at least one sliding counter-contact.

15. The base according to claim 1, wherein the at least one sliding counter-contact is a physically distinct component from the at least one contact pin.

16. The base according to claim 1, wherein the at least one sliding counter-contact is a pair of sliding counter-contacts positioned opposite one another around the rotary axis such that concave portions of the respective sliding counter-contacts face one another.

17. The base according to claim 1, wherein the at least one sliding counter-contact is prevented from twisting by a raised feature on a back side of the connecting part facing the fixing part.

* * * * *